United States Patent [19]
Swensgard et al.

[11] Patent Number: 5,973,429
[45] Date of Patent: Oct. 26, 1999

[54] SELF-ADJUSTING END PLAY ELIMINATOR SYSTEM AND METHOD

[75] Inventors: Brett Elling Swensgard, West Chester; Douglas Jan Lehr, Eaton, both of Ohio

[73] Assignee: Valeo Electrical Systems, Inc., Auburn Hills, Mich.

[21] Appl. No.: 09/148,909

[22] Filed: Sep. 4, 1998

[51] Int. Cl.⁶ .............................. H02K 15/14; H02K 5/16
[52] U.S. Cl. ........................... 310/90; 384/248; 384/249; 310/67 R
[58] Field of Search ..................... 310/90, 67 R, 310/42; 384/243, 248, 249, 251; 29/596, 598

[56] References Cited

U.S. PATENT DOCUMENTS

| | | | |
|---|---|---|---|
| 2,427,947 | 9/1947 | Koch | 384/251 |
| 2,539,879 | 1/1951 | Wightman | 384/248 |
| 2,564,307 | 8/1951 | Keiser | 384/251 |
| 3,161,447 | 12/1964 | Larsson et al. | 308/163 |
| 3,604,962 | 9/1971 | Larson | 310/67 R |
| 3,705,752 | 12/1972 | Ott et al. | 308/159 |
| 3,826,546 | 7/1974 | Hay | 384/248 |
| 4,185,214 | 1/1980 | Gerber et al. | 310/51 |
| 4,321,748 | 3/1982 | Ito | 29/596 |
| 4,613,778 | 9/1986 | Wrobel et al. | 310/90 |
| 4,649,306 | 3/1987 | Yamashita | 310/90 |
| 4,664,604 | 5/1987 | Terauchi | 417/222 |
| 4,690,573 | 9/1987 | Huffman | 384/251 |
| 5,144,738 | 9/1992 | Oyafuso | 310/90 |
| 5,169,245 | 12/1992 | Harada et al. | 384/610 |

OTHER PUBLICATIONS

"Bearing Cap, Thrust Pad, Spring-Thrust Pad, Bearing Cap Assembly and Insert Assembly", ITT Automotive, undated drawings.

*Primary Examiner*—Thomas M. Dougherty
*Assistant Examiner*—Burt Mullins
*Attorney, Agent, or Firm*—J. Gordon Lewis

[57] ABSTRACT

A system and method for facilitating the reduction or elimination of end play associated with an armature in an electric motor is disclosed. The system and method utilize an end play assembly which includes a housing having an integrally molded lock for retaining a screw in an unengaged and locked position. The end play assembly also includes a coil spring which urges the screw towards an engaged and unlocked position when the end play assembly is mounted in a housing of the electric motor. The lock includes at least one wing portion which engages a notch on the housing of the electric motor such that when the end play assembly is mounted in the motor housing, the notch forces the lock into the unlocked position which releases the screw so that the spring can urge, rotate or screw the screw to cause a screw end to be forced into engagement with the end of an armature of the electric motor. Advantageously, the end play assembly continuously and automatically adjusts for the end play to reduce or entirely eliminate any end play.

29 Claims, 3 Drawing Sheets

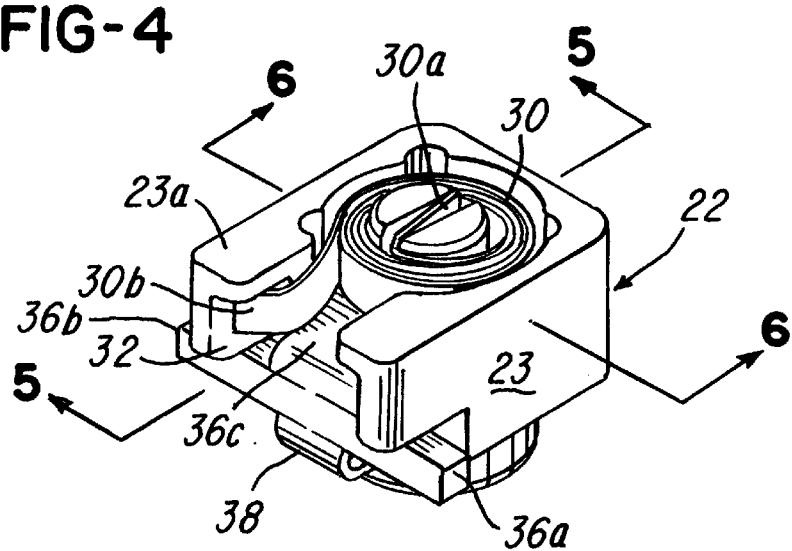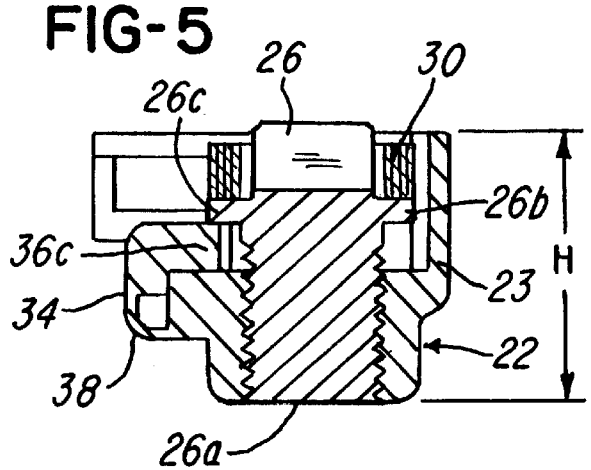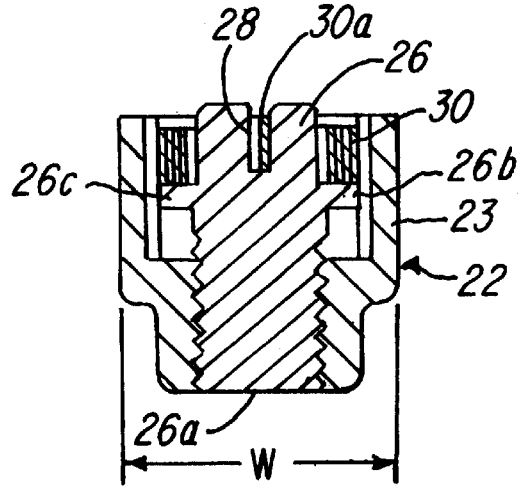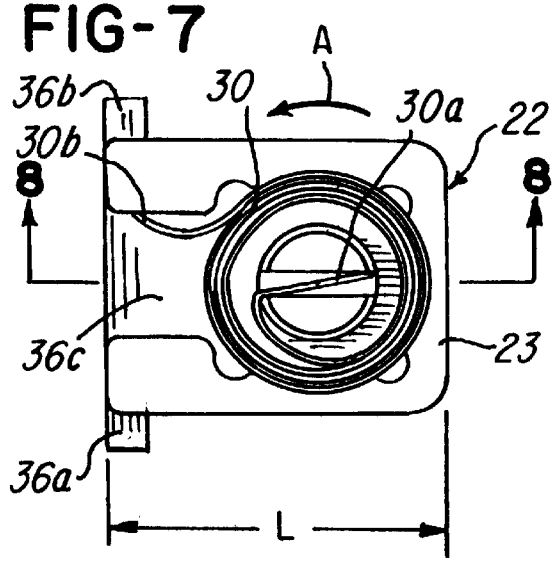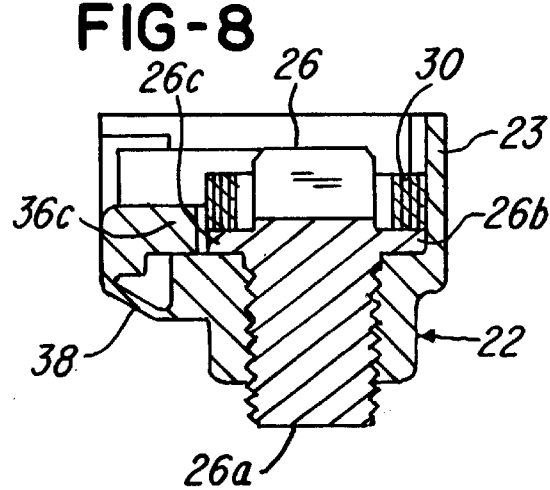

SELF-ADJUSTING END PLAY ELIMINATOR SYSTEM AND METHOD

BACKGROUND OF THE INVENTION

1. Field of the Invention

This invention relates to an end play eliminator used for receiving thrust of a motor shaft in a motor provided with a worm and, more particularly, an end play eliminator or assembly which continuously and automatically adjusts to eliminate end play associated with an armature of the motor.

2. Description of the Related Art

Heretofore, there have been used thrust bearing devices which have taken various forms to address end play due to tolerance accumulating of assembled components. End play is a gap between the tip of an armature and a thrust surface designed to carry an axial force associated with the armature. U.S. Pat. Nos. 3,161,447; 3,705,752; 4,185,214; 4,321,748; 4,690,573 and 5,169,245 all illustrate various thrust bearing devices used in the past.

However, the aforementioned devices, have various design and practical drawbacks. For example, U.S. Pat. No. 5,169,245 focuses on a thrust plate to be in constant contact with a shaft of the motor using a spring. It appears that the thrust plate is in constant contact with a motor shaft, but thrust loads of the armature against the thrust plate compresses the spring which, in turn, permits the entire shaft to shift in an axial direction which in essence allows for end play.

What is needed, therefore, is a compact assembly and method which automatically and continuously reduces or entirely eliminates end play associated with an armature shaft of a motor.

SUMMARY OF THE INVENTION

It is, therefore, a primary object of the invention to provide an end play assembly and method which automatically and continuously adjusts to eliminate end play associated with an armature of a motor.

Another object of the invention is to provide an end play assembly which is simple in design and which utilizes only a few components.

Another object of the invention is to provide an end play assembly which has a locking feature which locks a screw in a locked and unengaged position prior to assembly into a motor, yet which becomes unlocked to permit the screw to engage an armature when assembled in the motor.

Another object of the invention is to provide a one-piece end play assembly housing and lock which is an integrally molded, one-piece construction.

In one aspect, this invention consists of a self-adjusting end play eliminator including a threaded housing, a screw for threadably mounting in the housing, a spring associated with the screw and a lock associated with the housing for locking the screw in an unengaged position and capable of unlocking said screw when the threaded housing is mounted in a motor so that the spring can bias the screw to an engaged position where it engages an end of an armature of the motor to facilitate initially and continuously reduce end play associated therewith.

In another aspect, this invention comprises an end play assembly including a screw for situating in a motor housing and a spring associated with the screw for continuously driving the screw into engagement with an armature shaft of a motor in order to eliminate end play associated therewith.

In still another aspect, this invention comprises a motor consisting of a housing, an electric motor for situating in the housing, the motor comprising an armature, an end play assembly for mounting in the electric motor in operative relationship with the armature to facilitate reducing end play associated therewith, the end play assembly comprising a screw for situating in a motor housing and a spring associated with a screw for continuously driving a screw into engagement with an armature shaft of a motor in order to eliminate end play associated therewith.

In yet another aspect, this invention comprises a method for eliminating end play in an electric motor, the method comprising the steps of providing a motor housing, providing an electric motor for situating in the housing, the motor comprising an armature, providing an end play assembly for mounting in the electric motor in operative relationship with the armature to facilitate reducing end play associated therewith, the end play assembly comprising a screw for situating in a motor housing, and a spring associated with the screw for continuously driving the screw into engagement with an armature shaft of a motor in order to eliminate end play associated therewith.

These and other objects and advantages of the invention will be apparent from the following description, the accompanying drawings and the appended claims.

BRIEF DESCRIPTION OF ACCOMPANYING DRAWINGS

FIG. 4 is a perspective view of an end play assembly in accordance with an embodiment of the invention;

FIG. 5 is a sectional view taken along the line 5—5 in FIG. 4;

FIG. 6 is a sectional view taken along the line 6—6 in FIG. 4;

FIG. 7 is a plan view of the end play assembly showing at least one wing of a lock which engages a notch or stop in a housing of a motor; and FIG. 8 is a sectional view taken along the line 8—8 in FIG. 7.

DETAILED DESCRIPTION OF THE INVENTION

Figure 1:
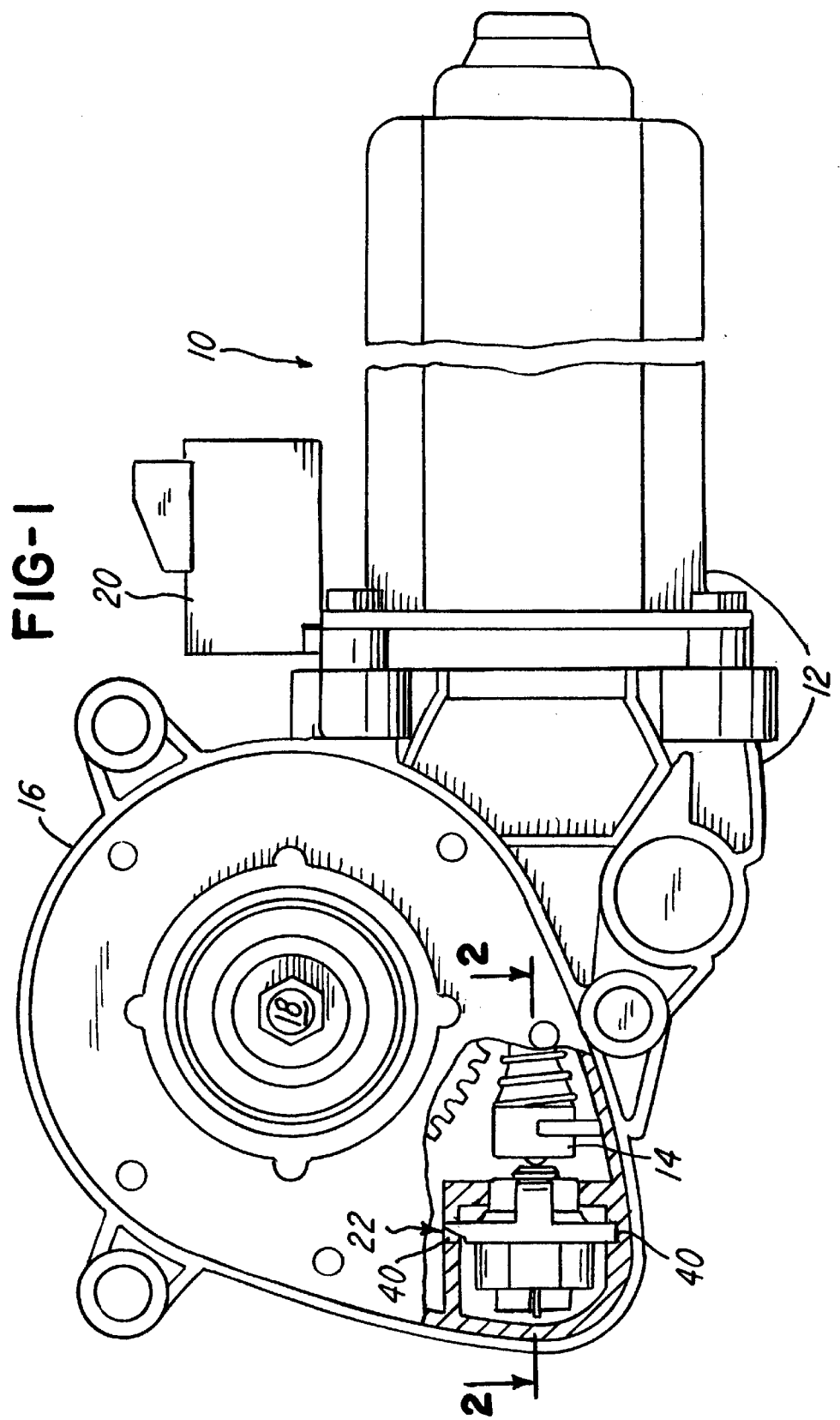
FIG. 1 is a fragmentary view of a motor incorporating features of this invention.

Referring now to FIG. 1, an electric motor 10 is shown comprising a housing 12 in which an armature 14 (FIG. 2) is rotatably mounted within a stator (not shown) to provide an electric motor for driving, for example, a window, car seat or other device. The armature 14 comprises an end 14a and a gear section 14b which defines a worm gear. The motor (FIG. 1) comprises an output gear assembly 16 having at least one output gear (not shown) which matingly engages gear portion 14b of armature 14 to drive an output shaft 18 which, in turn, drives a device of the type mentioned earlier in response to, for example, a switch (not shown) activated by a user. The electric motor 10 further comprises a connector 20 for connecting the electric motor 10 to a power source (not shown), switch and the like in a manner conventionally known.

As best illustrated in FIGS. 2–8, the electric motor 10 comprises an end play assembly 22 situated in the housing 12. The end play assembly 22 facilitates reducing or eliminating end play associated with the armature 14 by reducing or eliminating an end play gap 24 between the end play assembly 22 and a bearing 14c situated on the end 14a.

Notice in FIGS. 4–8, the end play assembly 22 comprises a threaded housing 23 for receiving a screw 26 which as a slot 28. The assembly 22 further comprises a spring 30 having an end 30a which is received in slot 28 for receiving an end 30a (FIG. 4) of a spring 30 which in the embodiment being described is a coil spring. A second end 30b of spring 30 is received in a recess area 32 of a wall 22a of housing 22.

Figure 2:
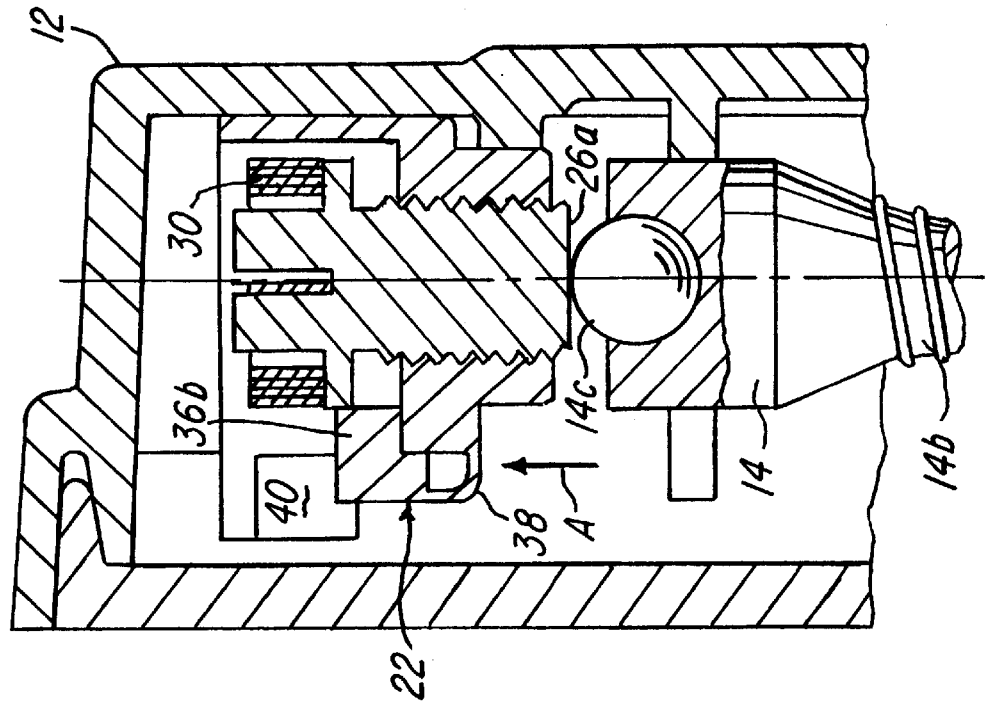
FIG. 2 is a sectional fragmentary view showing an end play assembly in a locked and unengaged position.
Figure 3:
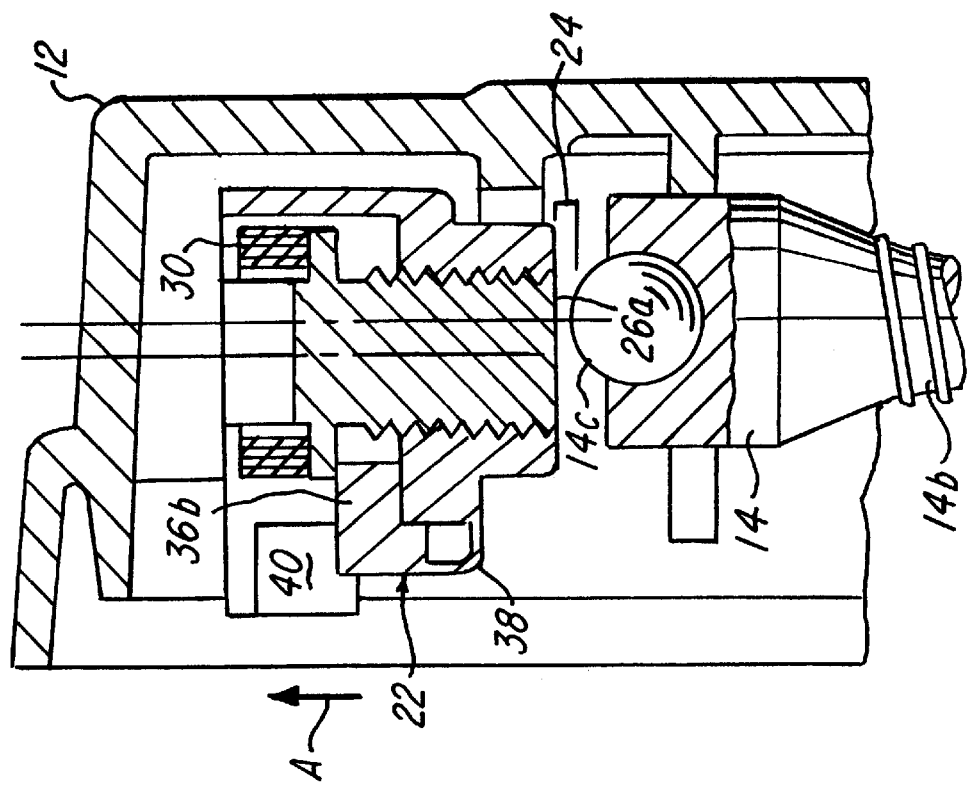
FIG. 3 is a fragmentary sectional view showing the end play assembly illustrated in FIG. 2 in an unlocked and engaged position.

The housing 22 is threaded, as mentioned and as best illustrated in FIGS. 5, 6 and 8, to permit the spring to threadably and rotatably bias or screw the screw 26 from a locked and unengaged position as illustrated in FIGS. 2, 5 and 6 towards an unlocked and engaged position, as illustrated in FIGS. 3 and 8.

The invention comprises a lock or means 34 for locking the screw 30 in the locked and unengaged position 34. The lock 34 is integrally molded as part of housing 23. In this regard, the lock 34 comprises an engaging end 36 which is coupled to housing 23 via a resilient hinge 38. The end 36 defines at least one wing portion (such as portions 36a and 36b in FIG. 7). As illustrated by the fragmentary cross-sectional view in FIG. 1, the housing 12 is cast or formed to define a recess or wall (shown in cross-section) for receiving the assembly 22. The wall defines recesses for receiving the wing portions 36a and 36b, and it also defines at least one notch or stop 40 (FIGS. 2 and 3).

Notice that the screw 26 comprises a head portion 26b (FIG. 6) defining an underside 26c which engages a middle portion 36c, as illustrated in FIGS. 5 and 7, to lock the screw 26 into the locked position. As the assembly 22 is received in recess area of the housings 12 and moved in the direction of arrow A (FIG. 2) to a fully mounted position (FIG. 3) in housing 23, the stationary notch or stop 40 of housing 12 forces the wing portions 36a and 36b from the locked position (FIG. 2) to the unlocked position (FIG. 3) which releases screw 26. Once the screw 26 is unlocked, the spring 30 urges or rotatably biases the screw 26 to screw downward (as viewed in FIG. 3) until an end 26a (FIGS. 2, 3 and 6) engages bearing 14c.

Thus, it should be appreciated that the lock or locking means 36 is capable of locking the screw 26 in the locked and unengaged position and capable of releasing or unlocking the screw in the engaged position when the housing 23 is mounted in housing 12 of motor 10. In turn, the coil spring 30 causes the screw 26 to be biased to the engaged position where it can engage the bearing 14c situated in the end 14a of armature 14 to facilitate reducing the end play gap 24.

It should also be appreciated that, since the spring 30 continuously urges and rotatably drives screw 26, the end play assembly 22 continuously urges end 26a of screw 26 against bearing 14c throughout the life of the motor 10. This provides means for continuously adjusting the end play assembly so that, as the end play gap 24 increases during normal operation of motor 10, the end play assembly continuously and automatically adjusts screw 26 to maintain contact between end 26a and bearing 14c situated in end 14a of armature 14.

In the embodiment being described, the housing 23 and lock 36 are an integrally molded one-piece construction. The width W (as viewed in FIG. 6) of the end play assembly is approximately 12.4 mm with its length L (as viewed in FIG. 7) being approximately 15.2 mm. The height H (FIG. 5) of housing 23 is approximately 12 mm.

In the embodiment being described, the screw 26 and threaded housing 22 are left-handed; however, right-handed threads may be used as well.

Advantageously, this invention provides means for reducing or entirely eliminating the end play gap 24 (FIG. 2) continuously and automatically over the life of the motor 10.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A self-adjusting end play eliminator comprising:
   a threaded housing;
   a screw for threadably mounting in said housing;
   a spring associated with said screw; and
   a lock associated with said housing for locking said screw in an unengaged position and capable of unlocking said screw when said threaded housing is mounted in a motor so that said spring can bias said screw to an engaged position where it engages an end of an armature of said motor to facilitate initially and continuously reduce end play associated therewith.

2. The self-adjusting end play eliminator as recited in claim 1 wherein said lock is hingedly and integrally molded with said threaded housing.

3. The self-adjusting end play eliminator as recited in claim 2 wherein said lock defines at least one wing movable from a locked position for engaging said screw to retain said screw in said unengaged position and an unlocked position for unengaging said screw to permit said screw to assume said engaged position.

4. The self-adjusting end play eliminator as recited in claim 1 wherein said spring is a coil spring.

5. The self-adjusting end play eliminator as recited in claim 1 wherein said spring is a coil spring, said screw comprising a slot for receiving an end of the spring such that when said spring and said screw are situated in said housing said spring biases said screw against said armature.

6. The self-adjusting end play eliminator as recited in claim 1 wherein said motor comprises a notch for engaging said at least one wing to cause said at least one wing to be actuated to said unlocked position when the eliminator is mounted in a housing of said motor, thereby permitting said screw to assume said engaged position.

7. An end play assembly comprising:
   a screw for situating in a motor housing; and
   a spring associated with said screw for continuously driving said screw into engagement with an armature shaft of a motor in order to eliminate end play associated therewith.

8. The end play assembly as recited in claim 7 wherein said eliminator further comprises:
   a threaded housing for receiving said screw and said spring for situating into said motor housing.

9. The end play assembly as recited in claim 8 wherein said threaded housing further comprises:
   a lock associated with said housing for locking said screw in an unengaged position and capable of unlocking said screw when said threaded housing is mounted in a motor so that said spring can bias said screw to an engaged position where it engages an end of an armature of said motor to facilitate initially and continuously reduce end play associated therewith.

10. The end play assembly as recited in claim 9 wherein said lock and said threaded housing are integrally molded.

11. The end play assembly as recited in claim 9 wherein said lock defines at least one wing movable from a locked position for engaging said screw to retain said screw in said unengaged position and an unlocked position for unengaging said screw to permit said screw to assume said engaged position.

12. The end play assembly as recited in claim 7 wherein said spring is a coil spring.

13. The end play assembly as recited in claim 7 wherein said spring is a coil spring, said screw comprising a slot for receiving an end of the spring such that when said spring and said screw are situated in said housing said spring biases said screw against said armature.

14. The end play assembly as recited in claim 7 wherein said motor comprises a notch for engaging said at least one wing to cause said at least one wing to be actuated to said unlocked position when the assembly is mounted in a housing of said motor, thereby permitting said screw to assume said engaged position.

15. A motor comprising:

a housing;

an electric motor for situating in said housing, said motor comprising an armature;

an end play assembly for mounting in said electric motor in operative relationship with said armature to facilitate reducing end play associated therewith, said end play assembly comprising:

a screw for situating in a motor housing; and a spring associated with said screw for continuously driving said screw into engagement with an armature shaft of a motor in order to eliminate end play associated therewith.

16. The motor as recited in claim 15 wherein said end play assembly further comprises:

a threaded housing for receiving said screw and said spring for situating into said motor housing.

17. The motor as recited in claim 16 wherein said threaded housing further comprises:

a lock associated with said housing for locking said screw in an unengaged position and capable of unlocking said screw when said threaded housing is mounted in a motor so that said spring can bias said screw to an engaged position where it engages an end of an armature of said motor to facilitate initially and continuously reduce end play associated therewith.

18. The motor as recited in claim 17 wherein said lock and said threaded housing are integrally molded.

19. The motor as recited in claim 17 wherein said lock defines at least one wing movable from a locked position for engaging said screw to retain said screw in said unengaged position and an unlocked position for unengaging said screw to permit said screw to assume said engaged position.

20. The motor as recited in claim 15 wherein said spring is a coil spring.

21. The motor as recited in claim 15 wherein said spring is a coil spring, said screw comprising a slot for receiving an end of the spring such that when said spring and said screw are situated in said housing said spring biases said screw against said armature.

22. The motor as recited in claim 15 wherein said motor comprises a notch for engaging said at least one wing to cause said at least one wing to be actuated to said unlocked position when said end play assembly is mounted in the housing, thereby permitting said screw to assume said engaged position.

23. A method for eliminating end play in an electric motor, said method comprising the steps of:

providing a motor housing;

providing an electric motor for situating in said housing, said motor comprising an armature;

providing an end play assembly for mounting in said electric motor in operative relationship with said armature to facilitate reducing end play associated therewith, said end play assembly comprising:

a screw for situating in a motor housing; and a spring associated with said screw for continuously driving said screw into engagement with an armature shaft of a motor in order to eliminate end play associated therewith.

24. The method as recited in claim 23 wherein said end play assembly further comprises:

a threaded housing for receiving said screw and said spring for situating into said motor housing.

25. The method as recited in claim 24 wherein said method further comprises the step of:

providing a lock associated with said housing for locking said screw in an unengaged position and capable of unlocking said screw when said threaded housing is mounted in a motor so that said spring can bias said screw to an engaged position where it engages an end of an armature of said motor to facilitate initially and continuously reduce end play associated therewith.

26. The method as recited in claim 25 wherein said method further comprises the step of:

providing an integrally molded lock and threaded housing.

27. The method as recited in claim 25 wherein said method further comprises the step of:

providing a lock which defines at least one wing movable from a locked position for engaging said screw to retain said screw in said unengaged position and an unlocked position for unengaging said screw to permit said screw to assume said engaged position.

28. The method as recited in claim 23 wherein said method further comprises the step of:

providing a coil spring as said spring.

29. The method as recited in claim 23 wherein said spring is a coil spring, said screw comprising a slot for receiving an end of the spring such that when said spring and said screw are situated in said housing said spring biases said screw against said armature.

\* \* \* \* \*